E. D. CLAPP.
Thill-Coupling.
No. 47,520. Patented May 2, 1865.
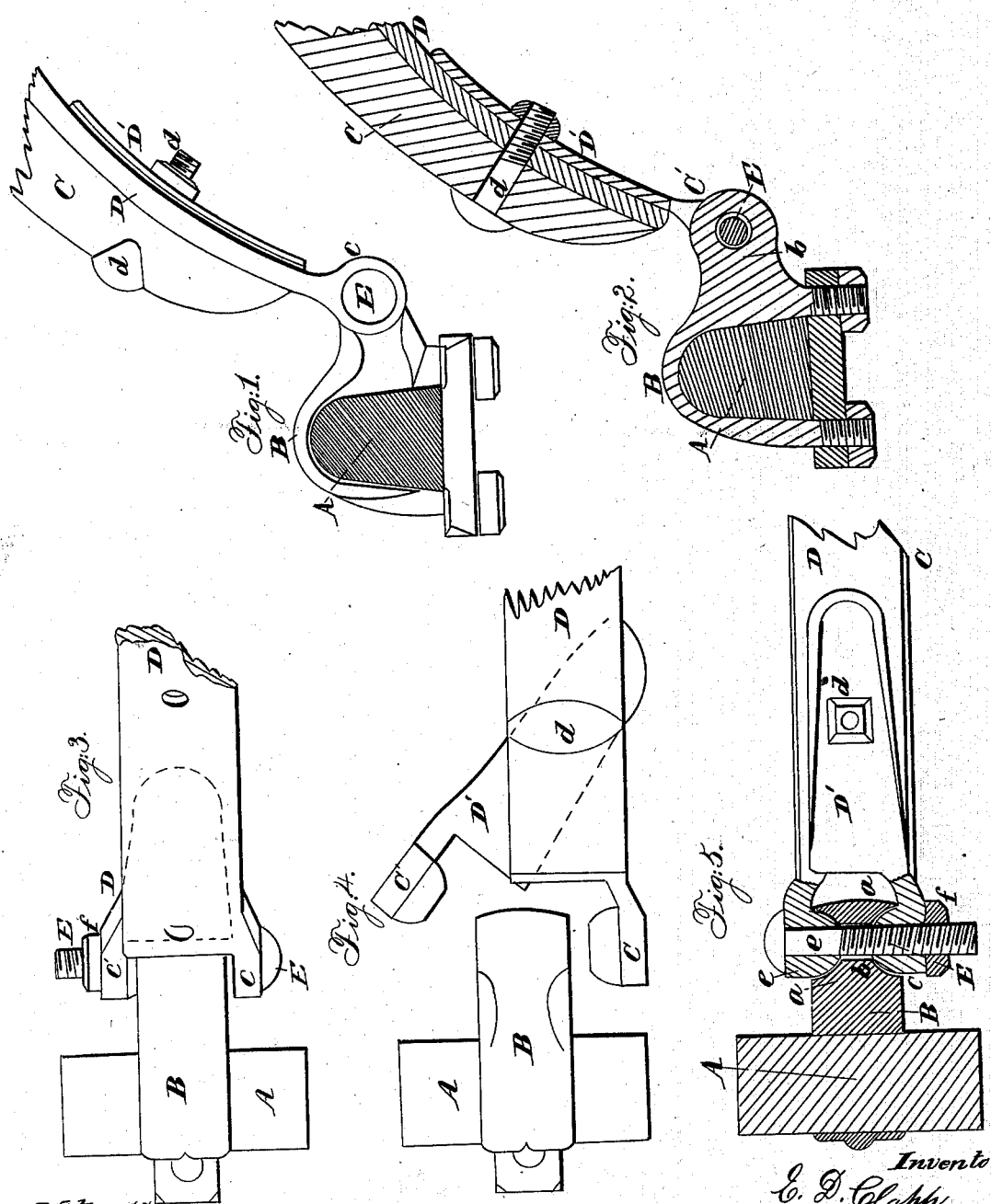

UNITED STATES PATENT OFFICE.

E. D. CLAPP, OF AUBURN, NEW YORK.

IMPROVEMENT IN COUPLINGS FOR THILLS.

Specification forming part of Letters Patent No. 47,520, dated May 2, 1865.

*To all whom it may concern:*

Be it known that I, E. D. CLAPP, of Auburn, in the county of Cayuga and State of New York, have invented a new and useful Improvement in Couplings for Thills or Shafts of Carriages; and I do hereby declare that the following is a full, clear, and exact description of the same, reference being had to the accompanying drawings, forming part of this specification, in which—

Figure 1 is a sectional view through a carriage-axle, showing the coupling and thill in side elevation. Fig. 2 is a longitudinal section through the thill and coupling as applied to the axle. Fig. 3 is a top view of the same with the wooden thill removed from its thill-iron. Fig. 4 is a top view of the whole as it appears when in condition for being coupled together or uncoupled. Fig. 5 is a bottom view and partial horizontal section showing the whole coupled together.

Similar letters of reference in the several figures indicate corresponding parts.

In the construction of couplings for carriage-thills it is important to have the bearings or axis of motion thereof capable of being "tightened up," so as to compensate for wear, and thus prevent the rattling noise so commonly heard during the rapid running of carriages.

For the above purpose a great many devices have been contrived and patented. Among these are found hollow cones fitted to conical seats and held in place by a coupling-screw pin, as in the patent of Wm. D. Titus; also are found conical bearings attached to the yoke or clip-irons, and made capable of opening on a pivot, as in the patents of C. W. Gage, granted July 23, 1861, and November 8, 1864. The plans of Gage are a great improvement over any others operating on the same general plan; but with the same a serious difficulty is experienced from the attachment of the thill-iron at the lowermost or topmost part of the clip-iron, as such attachment gives the thill-iron so much leverage strain upon the clip that frequent breakage of the same occurs.

To remedy this difficulty is the object of my invention, the nature of which consists in constructing the thill-iron in two parts, one of which moves laterally on a pivot, and furnishing each part with a hollow conical bearing, said bearings being fitted within seats which are in a forward extension of the clip-iron, and about midway of the depth of the axle, and having the coupling screw-bolt passed through the conical bearings and through the said extension.

By means of this construction and arrangement the pull upon the clip-iron is about midway of the depth of the axle, and thus the strain is distributed in such a manner as to greatly lessen the chances of breakage in the clip-iron. Again, the most approved style of clip-iron may be adopted when my improved style of coupling is used.

To enable others skilled in the art to make and use my invention, I will proceed to describe its construction and operation in connection with the drawings.

A is an axle of a carriage; B, a clip iron of the most approved and common construction, with the addition of conical or semi-spherical form seats $a\ a$ at the termini of the ends of its eye $b$, as represented. This clip-iron is fitted and clamped to the axle in the usual manner, as shown, so that its eye and the seats shall be about on a line with the center of the depth of the axle.

C is the wooden thill or shaft, and D D' its coupling-iron. The eye-bearings $c\ c'$ of this iron are conical and elongated so as to extend into and fit the seats $a\ a$ of the clip-iron, as shown, and thus serve as the axis and the support of the thill. The eye-bearing $c'$ is on the part D' of the coupling-iron of the thill, and said iron is lapped upon or against the under side of the part D of the thill-iron, and retained in place by means of a pivotal clamp-bolt, $d$, as represented, or by means equivalent thereto. By thus making the thill-iron in two parts, and uniting them by a pivot clamp-bolt, the eye-bearings are capable of being separated, as illustrated in Fig. 4, and the thill can then be moved aside, so as to be disconnected from the clip, as represented in said figure.

E is the usual coupling pin or bolt, which passes through the eyes of the clip and thill irons. This bolt is square at $e$, so as to be prevented turning. By means of this bolt and a nut, $f$, on its screw end the conical bearings can be set up into their seats, so as to compensate for wear, and thereby prevent rattling. This bolt is removed and the clamp-bolt $d$ slackened or removed, as desired, when it is necessary to detach the thills from the carriage.

The foregoing described thill or shaft coupling is very strong and durable, and at the same time is not heavy or cumbrous, when constructed in a skillful manner.

What I do claim as my invention, and desire to secure by Letters Patent, is—

The thill-iron constructed in two parts and with conical perforated bearings, the said two parts being pivoted together and made to overlap one another under the thill, in combination with the clip-iron constructed and arranged as described, all operating in the manner and for the purpose set forth.

Witness my hand in the matter of my application for a patent on my improved coupling for thills or shafts of carriages this 23d day of January, 1865.

E. D. CLAPP.

Witnesses:
 R. T. CAMPBELL,
 E. SCHAFER.